United States Patent [19]

Hashimoto et al.

[11] Patent Number: 4,756,967
[45] Date of Patent: Jul. 12, 1988

[54] MAGNETIC RECORDING MEDIUM

[75] Inventors: Morimi Hashimoto, Wako; Hiroshi Takagi, Yokohama; Kenji Suzuki, Yokohama; Nobuyuki Saito, Yokohama, all of Japan

[73] Assignee: Canon Kabushiki Kaisha, Tokyo, Japan

[21] Appl. No.: 866,315

[22] Filed: May 23, 1986

[30] Foreign Application Priority Data

May 25, 1985 [JP] Japan ................. 60-111365
May 25, 1985 [JP] Japan ................. 60-111366
May 25, 1985 [JP] Japan ................. 60-111367
May 25, 1985 [JP] Japan ................. 60-111368
May 25, 1985 [JP] Japan ................. 60-111369

[51] Int. Cl.$^4$ ............................................. G11B 5/72
[52] U.S. Cl. ................................. 428/336; 427/131; 428/694; 428/900
[58] Field of Search ............... 428/694, 900; 427/131

[56] References Cited

U.S. PATENT DOCUMENTS

| | | | |
|---|---|---|---|
| 4,391,874 | 7/1983 | Yamamoto et al. | 428/694 |
| 4,411,963 | 10/1983 | Aine | 427/131 |
| 4,486,498 | 12/1984 | Saito | 428/694 |
| 4,537,832 | 8/1985 | Kohmoto et al. | 427/131 |
| 4,554,217 | 11/1985 | Grimm et al. | 428/695 |
| 4,565,734 | 1/1986 | Arai et al. | 427/131 |
| 4,582,746 | 4/1986 | Shirahata et al. | 427/131 |
| 4,596,735 | 6/1986 | Noguchi et al. | 427/131 |
| 4,599,280 | 7/1986 | Izumi et al. | 428/694 |

Primary Examiner—Paul J. Thibodeau
Attorney, Agent, or Firm—Fitzpatrick, Cella, Harper & Scinto

[57] ABSTRACT

A magnetic recording medium, comprising a non-magnetic substrate, a magnetic recording layer of a ferromagnetic film on the substrate, and a protective layer on the magnetic recording layer. The protective layer is formed of oxide of an alloy of Co and a metal selected from the group consisting of Ti, Zr, Hf, Nb, Ta, Mo, Rh, Pd, and Si. The protective layer is preferably formed by deposition from vapor phase of the metal components constituting the alloy in an oxygen atmosphere under a reduced pressure. The protective layer provides for a durability and corrosion resistance to the magnetic recording medium.

18 Claims, 3 Drawing Sheets

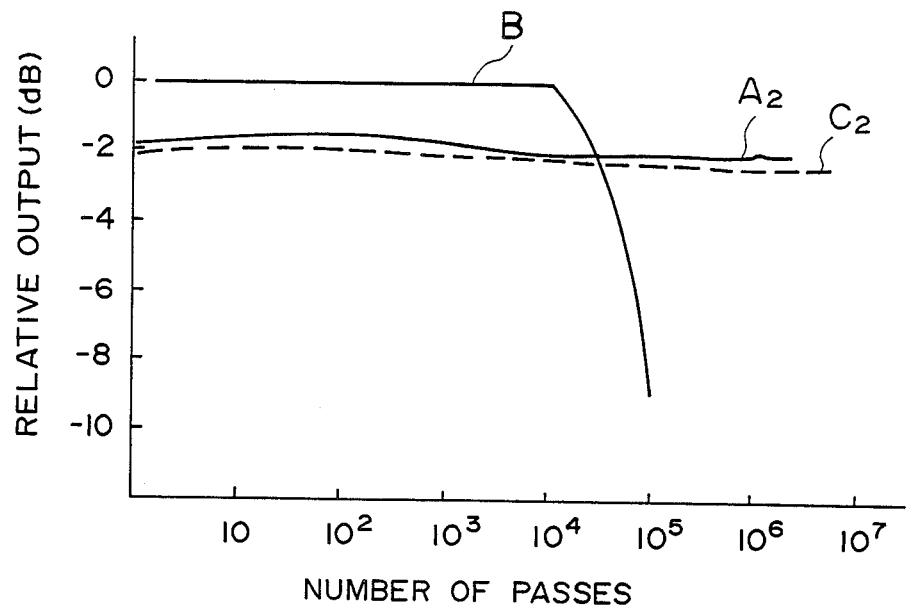
F I G. 3
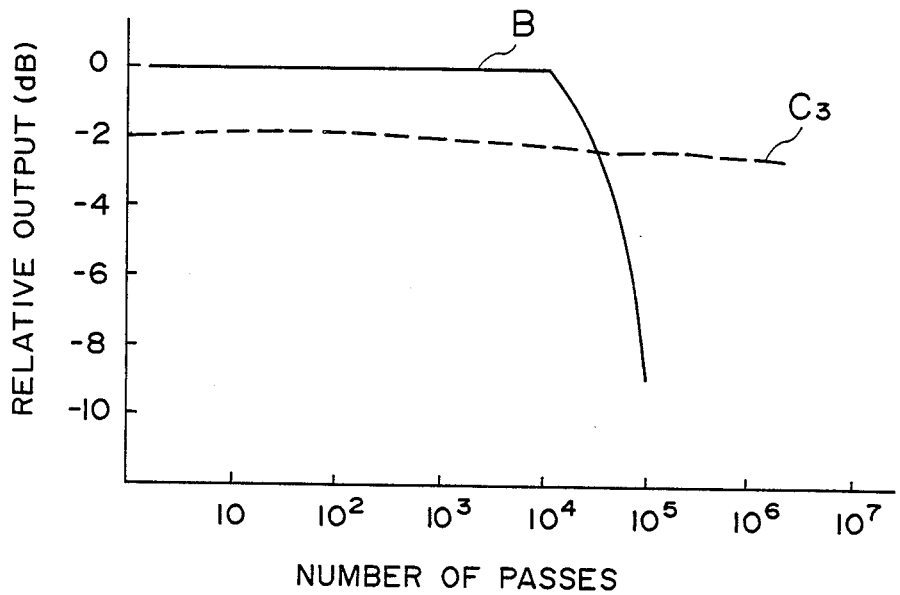
F I G. 4

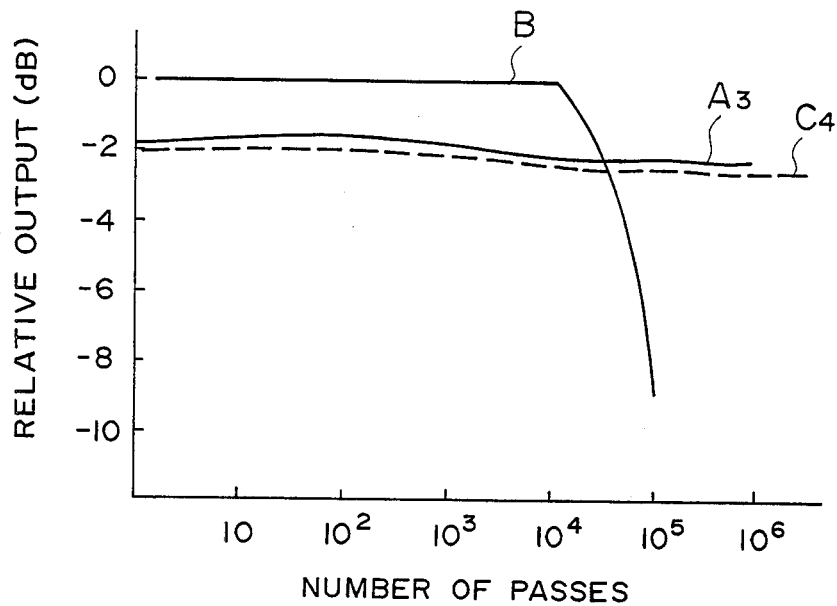
F I G. 5
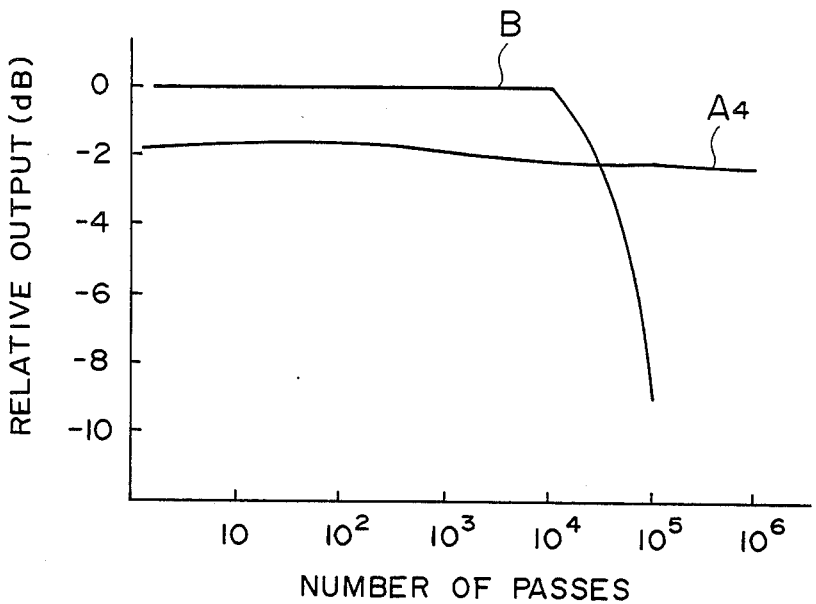
F I G. 6

_4,756,967_

MAGNETIC RECORDING MEDIUM

FIELD OF THE INVENTION AND RELATED ART

The present invention relates to a magnetic recording medium excellent in corrosion resistance, wear resistance and durability.

Recently, magnetic recording media have been practically used which include a ferromagnetic film formed on a substrate by various methods and containing a metal or alloy of Fe, Co, Cr or Ni.

Such magnetic recording media have an important feature that the ferromagnetic film can be formed in an extremely reduced thickness and hence, in reproducing a signal recorded in the magnetic recording medium, the spacing loss can be diminished, so that the reproduction at a shorter wavelength side may be advantageously effected.

However, the above described ferromagnetic film of a metal or alloy is accompanied by a serious problem in that it is readily corroded.

A further serious problem is that when such a metal film type magnetic recording medium, for example, in the form of a magnetic tape, is allowed to travel within a recording and reproducing apparatus and slide in contact with a guide post or a magnetic head, the ferromagnetic film constituting the magnetic tape can be worn out.

The above are important problems concerned with reliability of a magnetic recording medium. In order to solve these problems, it has been conventionally proposed to provide on the ferromagnetic film a top coat layer of materials such as fatty acids, hydrocarbons, higher fatty acids, oxy fatty acids, fatty acid amides, fatty acid esters, fatty alcohols, and metal soaps.

With the conventionally known methods, such a top coat layer is not easily formed in a uniform thickness. The lubricity and other effects decrease with the use, and the durability is not certain. For this reason, the conventional methods are not satisfactory. In addition, if the thickness of the coating film is increased, a reduction in output occurs due to a spacing loss. Thus, it has been difficult to form a film which is thin, has a durability, and also has the intended effects.

SUMMARY OF THE INVENTION

It is an object of the present invention to provide a thin metal film-type magnetic recording medium in which the aforesaid problems found in the prior art are eliminated and which is excellent in both durability and corrosion resistance.

According to the present invention, there is provided a magnetic recording medium comprising a non-magnetic substrate, a magnetic recording layer of a ferromagnetic film on the substrate, and a protective layer on the magnetic recording layer, the protective layer being formed of oxide of an alloy of Co and a metal selected from the group consisting of Ti, Zr, Hf, Nb, Ta, Mo, Rh, Pd and Si.

BRIEF DESCRIPTION OF THE DRAWINGS

FIGS. 2 to 6 are respectively graphs illustrating the results of the tests for durability of vertical two layer floppy disks.

DETAILED DESCRIPTION OF THE INVENTION

Figure 1:
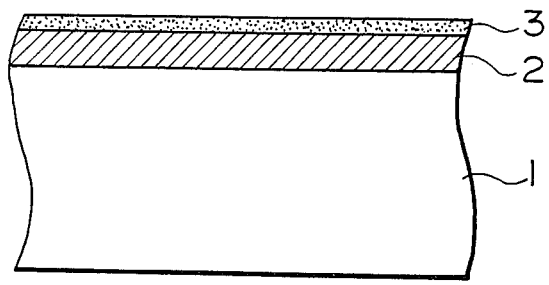
FIG. 1 is a diagram illustrating the arrangement of a magnetic recording medium according to the present invention.
Figure 2:
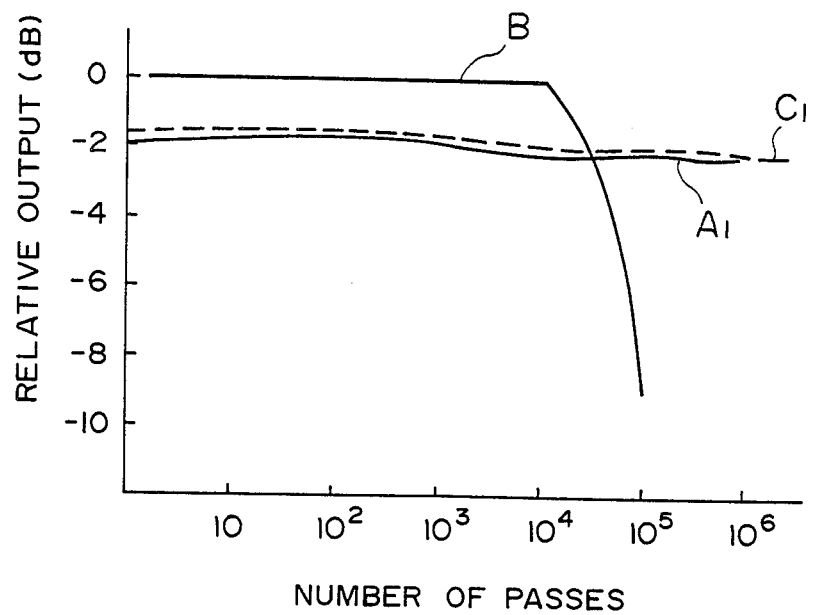

Referring to FIG. 1, a magnetic recording medium according to the present invention comprises a non-magnetic substrate 1, a magnetic layer 2 on the non-magnetic substrate 1 and further, a protective layer 3 formed on the magnetic layer 2.

The non-magnetic substrate may, for example, be films of plastics such as polyethylene, terephthalate, polyimides, polycarbonates, and polyamides, or a film, sheet or plate of stainless steel, aluminum or glass. The thickness of the non-magnetic substrate may be preferably of 5 to 100 μm.

The magnetic recording layer 2 may be formed of a metal such as Fe, Co and Ni, or an alloy containing at least one of these metals. Illustrative of the materials of the magnetic recording layer 2 are Fe-Co, Fe-Ni, Fe-Mn, Fe-Cr, Fe-V, Fe-Cu, Fe-Ti, Fe-Co-Ni, Fe-Co-B, Fe-Co-Cr and Fe-Co-V, and further, Co-based alloys such as Co-Cr, Co-V, Co-Mo, Co-W, Co-Cr-Cr, Co-Cr-Mo and Co-Cr-Rh. Among them, Co-Cr is preferred for the magnetic recording layer, because it has a relatively large vertical magnetic anisotropy and can be relatively easily formed into a vertically magnetizable film. The magnetic recording layer 2 may be formed by, e.g., vapor deposition or vacuum evaporation, sputtering, ion plating, or wet plating. The preferred thickness of the magnetic recording layer 2 is in the range of 0.05 μm to 1.0 μm.

The protective layer 3 may comprise an oxide of an alloy of Co and a metal selected from the group consisting of Ti, Zr, Nb, Ta, Mo, Rh, Rd, and Si.

The protective layer 3 is required to have such a property that it will not easily cause cohesion or agglutination with a head material and hence, it is excellent in lubricity, while at the same time, it may strongly adhere to the underlying magnetic recording layer 2 and will not easily be peeled off therefrom.

The reason why the Co-based oxide is excellent as the protective layer may be that when in the form of $Co_3O_4$ (spinel structure), such oxide has a solid lubricity to largely contribute to reduction in surface cohesion tendency. To provide a protective layer having a good durability, a somewhat metallic phase should desirably remain in the protective layer. It is presumed that the remaining metallic phase affords an improvement in adhesion of the protective layer with the magnetic layer.

It may be assumed that corrosion can occur due to the oxidation of this metallic phase. In the present invention, however, the metallic phase in the protective layer comprises an alloy of Co and a metal selected from the group consisting of Ti, Zr, Hf, Nb, Ta, Mo, Rh, Pd, and Si and thus has a high corrosion resistance. Consequently, a corrosion resistance is assured even if the metallic phase remains.

The thickness of the protective layer is preferably 50 to 500 Å. If the thickness is less than 50 521, the effect as a protective and lubricative layer is not satisfactorily exhibited, while if the thickness is more than 500 Å, the spacing between the head and the magnetic recording layer is increased, resulting in reduction in reproducing efficiency. The atomic ratio of Co to the added metal is preferably in the range of 1:9 to 9:1 when the added metal is Ti, Zr or Hf, more preferably, in the range of 2:8 to 8:2. Within the above range, it is particularly desired that the Co is used in a larger amount on an atomic basis than the added metal. The foregoing also holds true with a case where the added metal is Nb, Ta or Mo.

When the added metal is Rh or Pd, the added metal is preferably used in an amount of 3-30 atom. %, more preferably in an amount of 5 to 20 atom. %, based on the total atoms of Co and the added metal. This is also true when the added metal is Si.

V or W may effectively be further incorporated in addition to the above-described metal. For example, oxides which may be used in this way include those of Co-Nb-V produced by further adding V to Nb and Co, or Co-Mo-W produced by further adding W to Mo and Co. In this case, a first metal and a second metal to be added to Co are desirably used in substantially the same amount.

The protective layer 3 may be formed by the vapor deposition or ion plating of an alloy as described above in the atmosphere of an oxidative gas such as oxygen or ozone. Alternatively, it may be formed by sputtering of such an alloy in an inert gas containing an oxidative gas. The amount of oxygen contained in the atmosphere in forming the protective layer depends on the size of an apparatus used, the distance between a source of vapor and a magnetic medium on which the protective layer is to be deposited, and the film forming rate. In a vapor deposition or ion plating process, the protective layer may be usually formed in under a pressure of $10^{-4}$ to $10^{-2}$ Torr, while in a sputtering process, it may be formed under a total pressure of ordinarily $10^{-4}$ to $10^{-1}$ Torr with a partial oxygen pressure of 5 to 50% against a partial inert gas pressure. In any process, increase in amount of oxygen contained in the atmosphere in the formation of the protective layer results in an increased content of oxygen in the formed protective layer 3. The content of oxygen in the thus-formed protective layer 3 cannot generally be measured exactly because it is in a very small amount. However, the presence of oxygen in the protective layer can be confirmed by the Auger analysis or ESCA (Electron Spectroscopy for Chemical Analysis).

The magnetic recording medium of the present invention may be provided with an intermediate layer which is contemplated, for example, to enhance the adhesion between the non-magnetic substrate and the magnetic recording layer or control the unevenness of the surface. In addition, the protective layer may be provided thereon with a film as a lubricative layer, which film is of a fatty acid, higher fatty acid, oxy fatty acid, fatty acid amide, fatty acid ester, fatty alcohol, or metal soap. Further, a lubricative layer or an antistatic layer may be formed also on the reverse surface of the substrate.

In producing the magnetic recording medium of the present invention, it is desirable for the improvement of productivity to successively form the magnetic recording layer and the protective layer by use of a successive vapor-deposition apparatus having two deposition chambers.

The magnetic recording medium of the present invention may be in any form of a disk, sheet, tape or card, so long as the protective layer for the magnetic recording layer is required to be corrosion- and wear-resistant.

As described above, the magnetic recording medium of the present invention has a Co-based protective layer having an excellent lubricity and further containing the previously described additional metal and is, accordingly, excellent in durability, wear resistance and corrosion-resistance.

The present invention will now be described in more detail by way of Examples.

EXAMPLE 1

A thin ferromagnetic film having a composition of Co 0.8 - Ni 0.2 was formed in a thickness of 0.2 μm on a polyethylene terephthalate film having a thickness of 12 μm by the oblique vapor deposition, and oxide layers of Co-Ti, Co-Mo, Co-Rh and Co-Si were formed respectively and separately in a thickness of 100 Å on the surface of the thin ferromagnetic film by sputtering, thereby to produce four magnetic recording media according to the present invention. In the formation of the oxide layer of Co-Ti, the sputtering was conducted in Ar gas containing 10% of oxygen gas by simultaneously using two source targets of Co and Ti. The total pressure of oxygen and Ar gases was $4 \times 10^{-3}$ Torr. The area ratio of the targets Co to Ti was of 1:1. The oxide layers of Co-Mo, Co-Rh and Co-Ti were also formed under the similar conditions by use of two source targets, wherein the area ratio of Co to the added metal was 6:1 for the oxide layer of Co-Rh and 5:1 for the oxide of Co-Si.

COMPARATIVE EXAMPLE 1

For the purpose of comparison, a magnetic tape having only a magnetic layer of Co-Ni was produced with no protective layer formed thereon.

The above-described media were respectively cut into ½ inch, and a still image was reproduced for 20 minutes in a VHS video deck. Then, upon observation of the amount of worn-out magnetic layer, no wearing was substantially observed or no fluctuation in reproducing output was observed for the four magnetic tapes of the present invention. On the contrary, the magnetic layer was scraped off in ten minutes for the tape of Comparative Example 1.

As the magnetic tapes of the present invention and the magnetic tape of Comparative Example 1 were exposed to the environment of a humidity of 90% and a temperature of 70° C. for about 100 hours in a thermohygrostat, spots of corroded portions were observed on the medium of Comparative Example 1, whereas no corrosion was found on the magnetic tapes of the present invention. The friction coefficiency against a guide post made of SUS (4 mmφ and an unevenness of 0.2 S) was 0.48 for the magnetic tape of Comparative Example 1, whereas it was at a substantially reduced level for each magnetic tape according to the present invention, i.e., 0.28 for one having the Co-Ti oxide protective layer, 0.29 for one having the Co-Mo oxide protective layer, 0.27 for one having the Co-Rh oxide protective layer and 0.25 for one having the Co-Si oxide protective layer.

EXAMPLE 2

An alloy of Co 80 atom. % - Hf 20 atom. % and an alloy of Co 80 atom. % - Nb 20 atom. % were vapor-deposited on the magnetic tape having the same magnetic recording layer and base film as those in Example 1 by an electron-beam heating vapor deposition under an oxygen partial pressure of $2 \times 10^{-4}$ Torr to produce a magnetic recording medium having a Co-Hf oxide layer formed in a thickness of 200 Å on the magnetic recording layer and a magnetic recording medium having a Co-Nb oxide layer formed in a thickness of 200 Å on the magnetic recording layer. The two magnetic recording tapes of the present invention were subjected to measurement of wearing, corrosion resistances, and kinematic friction coefficient in the same manner as in Example 1. The results showed that for the two magnetic recording media of the present invention, no reduction in reproducing output or generation of flaw was observed after the still reproduction for 20 minutes, and the generation of rust was not also found at all even after a test carried out in a high temperature and high humidity environment. In addition, the kinematic friction coefficient was of 0.26 with the magnetic recording medium having the Co-Hf oxide layer and 0.29 with the magnetic recording medium having the Co-Nb oxide layer and thus was substantially reduced as compared with that of the magnetic tape of Comparative Example 1.

EXAMPLE 3

A film of Ni 80 wt. % - Fe 20 wt. % and a vertically magnetizable film of Co 80 wt. % - Cr 20 wt. % were successively formed respectively in thickness of 0.5 μm and 0.3 μm on a polyimide film of 40 μm in thickness by sputtering. Further, a Co-Zr oxide layer was formed thereon in 200 Å under a 10%-oxygen partial pressure by sputtering using targets of Co and Zr. In a similar manner, a Co-Ta oxide layer, a Co-Pd oxide layer, and a Co-Si oxide layer, were formed in 200 Å on the vertically magnetizable film under a 12%-oxygen partial pressure by use of targets of Co and Ta, targets of Co and Pd, and targets of Co and Si, respectively, to produce four magnetic recording media of the present invention. In any case, the total pressure of oxygen and Ar gases was $4 \times 10^{-3}$ Torr. The area ratios of Co target to Zr target and Co target to Ta target were respectively 2:1; the area ratio of Co target to Pd target was 8:1; and the area ratio of Co target and Si target was 7:1. The thus-produced four vertical two-layer floppy disks respectively identified as A1 (having the Co-Zr oxide layer), A2 (having the Co-Ta oxide layer), A3 (having the Co-Pd oxide layer), and A4 (having the Co-Si oxide layer), and a vertical two-layer floppy disk B having no protective layer for comparison, were respectively tested for durability. The results showed that as shown in FIGS. 5 and 6, the disk B having no protective layer resulted in a decrease of 6 dB in reproducing output after 90,000 passes, while the disks A1, A2, A3 or A4 of the present invention showed no decrease in reproducing output or flow due to the travel of a head even after one million passes, thus showing an extremely excellent durability.

EXAMPLE 4

A Co-Ti-Hf oxide layer was formed in 200 Å on a magnetic disk having the same base film and magnetic recording layer as those in Example 3 under a 10%-oxygen partial pressure by sputtering with targets of Co, Ti and Hf. In a similar manner, a Co-V-Nb oxide layer, a Co-Mo-W oxide layer, and a Co-Rh-Pd oxide layer, were formed in 200 Å on the vertically magnetizable film under a 10%-oxygen partial pressure respectively by use of targets of Co, V and Nb, targets of Co, Mo and W and targets of Co, Rh and Pd, respectively, to produce four magnetic recording media of the present invention. In any case, the total pressure of oxygen and Ar gases was $4 \times 10^{-3}$ Torr. The area ratios of targets Co to Ti to Hf, and Co to Mo to W were respectively 4:1:1, and the area ratio of targets Co to Rh to Pd was 16:1:1. The thus-produced vertical two-layer floppy disks, respectively, identified as C1 (having the Co-Ti-Hf oxide layer), C2 (having the Co-V-Nb oxide layer), C3 (having the Co-Mo-W oxide layer) and C4 (having the Co-Rh-Pd oxide layer) of the present invention were tested for durability. As a result, as shown in FIGS. 2 to 5, the reproducing output did not reduce or any flaw due to the travel of a head was not generated even after 1.20 million passes, thus showing an extremely excellent durability. Particularly for the disk C3, any reduction in reproducing output or any flaw due to the travel of the head was not observed even after 1.50 million passes.

What is claimed is:

1. A magnetic recording medium, comprising a non-magnetic substrate, a magnetic recording layer of a ferromagnetic film on said substrate, and a protective layer at least 50 Å in thickness formed on said magnetic recording layer by vapor depositing or sputtering under constant oxygen pressure, said protective layer being formed of an oxide of an alloy of Co and (i) at least one metal selected from the group consisting of Ti, Zr, Hf, Nb, Ta or Mo in an atomic ratio to Co from 1:9 to 9:1 or (ii) at least one element selected from the group consisting of Rh, Pd or Si in an amount of 3 to 30 atomic percent based on the total of Co and said at least one of Rh, Pd or Si.

2. A magnetic recording medium according to claim 1, wherein the thickness of said protective layer is 50 to 500 Å.

3. A magnetic recording medium according to claim 1, wherein said magnetic recording layer comprises a metal selected from the group consisting of Fe, Co, and Ni.

4. A magnetic recording medium according to claim 3, wherein said magnetic layer comprises Co.

5. A magnetic recording medium according to claim 1, wherein said protective layer is formed of oxide of an alloy of Co and a metal selected from the group consisting of Ti, Zr and Hf.

6. A magnetic recording medium according to claim 5, wherein said atomic ratio is in the range of 2:8 to 8:2.

7. A magnetic recording medium according to claim 1, wherein said protective layer is formed of oxides of an alloy of Co and a metal selected from the group consisting of Nb and Ta.

8. A magnetic recording medium according to claim 1, wherein said protective layer is formed of oxide of an alloy of V, Nb, and Co.

9. A magnetic recording medium according to claim 7, wherein said atomic ratio is in a range of 2:8 to 8:2.

10. A magnetic recording medium according to claim 1, wherein said protective layer is formed of the oxide of an alloy of Mo and Co.

11. A magnetic recording medium according to claim 1, wherein said protective layer is formed of the oxide of an alloy of Mo, W and Co.

12. A magnetic recording medium according to claim 12, wherein said atomic ratio is in the range of 2:8 to 8:2.

13. A magnetic recording medium according to claim 1, wherein said protective layer is formed of oxide of an alloy of Co and a metal selected from the group consisting of Rh and Pd.

14. A magnetic recording medium according to claim 13, wherein the metal selected from the group consisting of Rh and Pd is contained 5 to 20 atom. % based on the total of Co and said metal.

15. A magnetic recording medium according to claim 1, wherein said protective layer is formed of oxide of an alloy of Si and Co.

16. A magnetic recording medium according to claim 15, wherein the Si is contained in a proportion of 5 to 20 atom. % based on the total of Co and Si.

17. A magnetic recording medium, comprising a non-magnetic substrate, a magnetic recording layer of a ferromagnetic film on said substrate, and a protective layer at least 50 angstroms in thickness formed on said magnetic recording layer by vapor depositing or sputtering under constant oxygen pressure, said protective layer being formed of an oxide of an alloy of Nb, V and Co, wherein the atomic ratio of Co to Nb is from 1:9 to 9:1.

18. A magnetic recording medium, comprising a non-magnetic substrate, a magnetic recording layer of a ferromagnetic film on said substrate and a protective layer at least 50 angstroms in thickness formed on said magnetic layer by vapor depositing or sputtering under constant oxygen pressure, said protective layer being formed of an oxide of an alloy of Mo, W and Co, wherein the atomic ratio of Co to Mo is from 1:9 to 9:1.

* * * * *

UNITED STATES PATENT AND TRADEMARK OFFICE
CERTIFICATE OF CORRECTION

PATENT NO. : 4,756,967
DATED : July 12, 1988
INVENTOR(S) : MORIMI HASHIMOTO, ET AL.

It is certified that error appears in the above-identified patent and that said Letters Patent is hereby corrected as shown below:

COLUMN 1

Line 21, "above described" should read --above-described--.
    Line 26, "fape," should read --tape,--.
    Line 35, "materials" should read --materials,--.

COLUMN 2

Line 2, "two layer" should read --two-layer--.
    Line 13, "polyethylene," should read --polyethylene--.
    Line 17, "of" should read --from--.
    Line 62, "50 521," should read --50 Å--.

COLUMN 3

Lines 2-5, delete boldface type.
    Line 12, "metal." should read --metals.--.
    Line 30, "in" should be deleted.

COLUMN 5

Line 51, "flow" should read --flaw--.

COLUMN 6

Line 62, "12,' should read --10,--.

UNITED STATES PATENT AND TRADEMARK OFFICE
CERTIFICATE OF CORRECTION

Page 2 of 2

PATENT NO. : 4,756,967
DATED : July 12, 1988
INVENTOR(S) : MORIMI HASHIMOTO, ET AL.

It is certified that error appears in the above-identified patent and that said Letters Patent is hereby corrected as shown below:

COLUMN 8

Line 7, "substrate" should read --substrate,--.

Signed and Sealed this

Thirty-first Day of January, 1989

Attest:

DONALD J. QUIGG

Attesting Officer

Commissioner of Patents and Trademarks